UNITED STATES PATENT OFFICE.

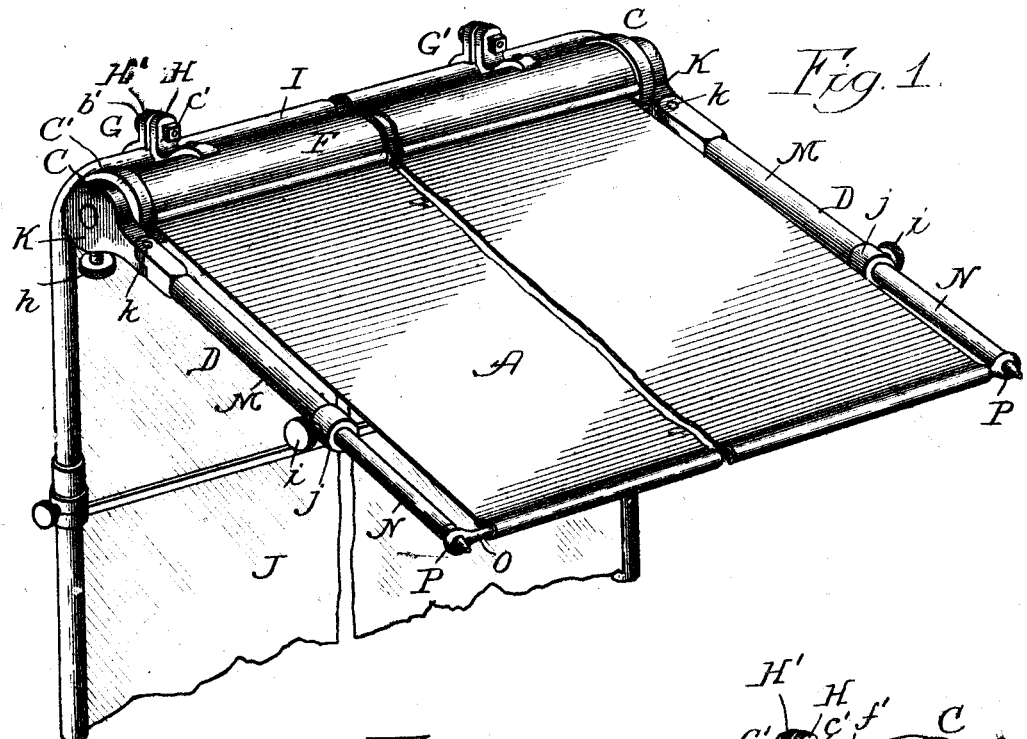
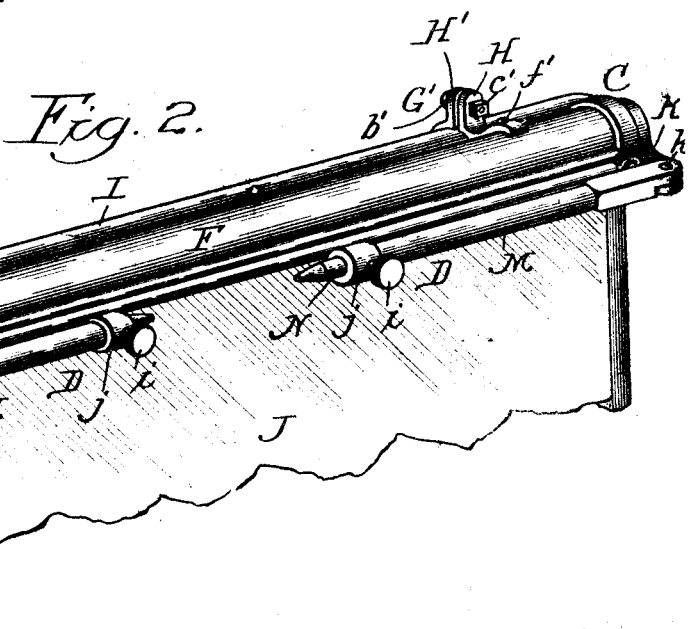

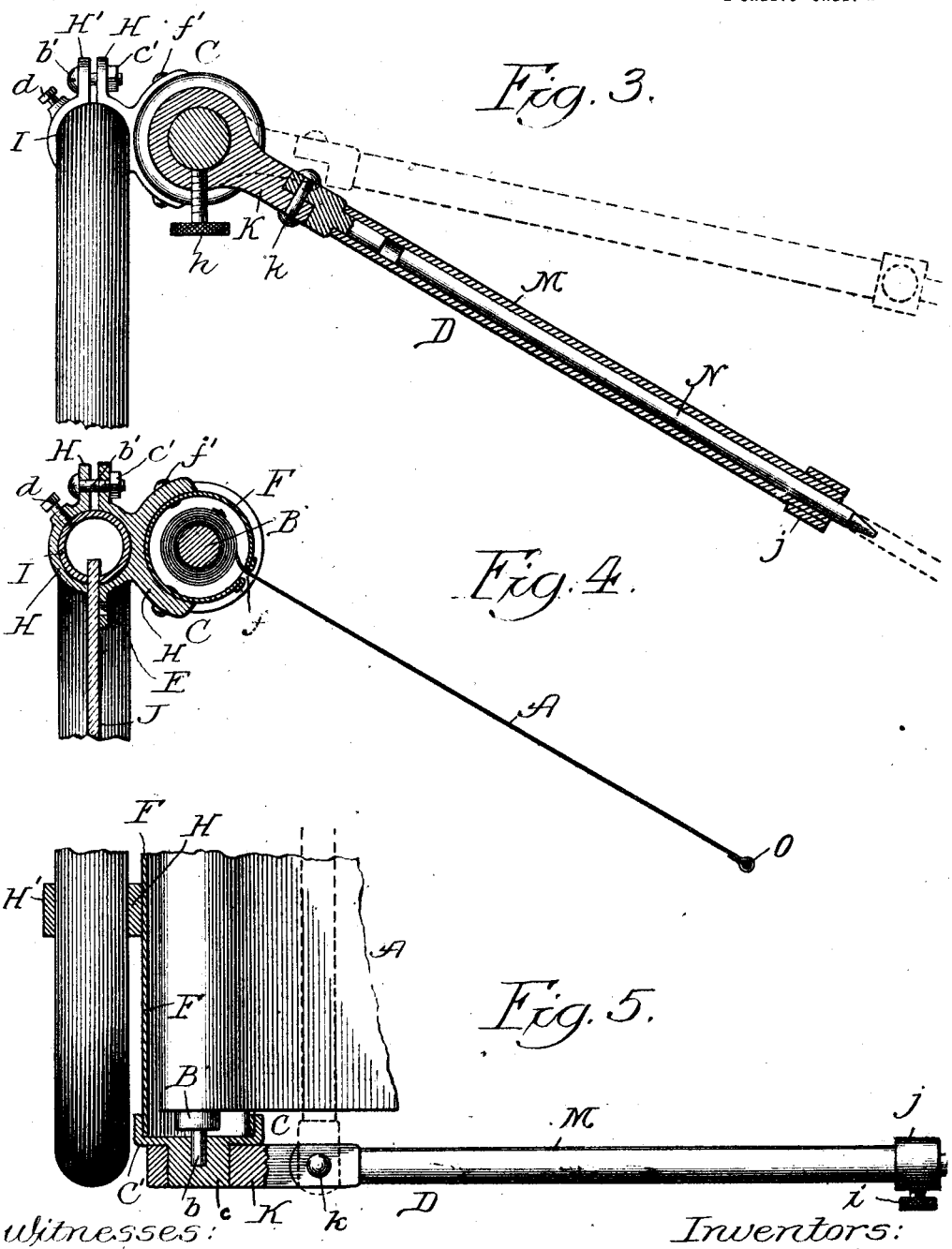

CHARLES OTTO FOEDISCH AND ROY J. FOEDISCH, OF CHICAGO, ILLINOIS.

WIND-SHIELD ATTACHMENT.

1,180,124. Specification of Letters Patent. Patented Apr. 18, 1916.

Application filed March 12, 1914. Serial No. 824,099.

*To all whom it may concern:*

Be it known that we, CHARLES O. FOEDISCH and ROY J. FOEDISCH, residents of Chicago, in the county of Cook and State of Illinois, have invented new and useful Improvements in Wind-Shield Attachments, of which the following is a full, clear, and exact description.

The invention relates to shields or protectors.

The invention designs to provide an attachment for protecting a glass front from rain, snow, sleet and hot sun and one which may be used in connection with wind-shields of motor vehicles or on street cars, elevated trains, locomotive cabs, etc., where such protection is desired.

The invention designs to provide an extensible curtain adjustably supported on a glass carrying frame or wind shield and adapted to be spaced therefrom and to project in front of the same to protect the glass front from the elements.

The invention further designs to provide an extensible curtain or shield projecting in front of a wind shield or other glass carrying frame and suitably supported on an adjustable folding frame.

The invention further designs to provide an attachment for a glass front to protect the same from the elements.

The invention consists in the several novel features hereinafter set forth and more particularly defined by claims at the conclusion hereof.

In the drawings: Figure 1 is a perspective view of the device embodying the invention showing the parts in operative position. Fig. 2 is a perspective view of the device in inoperative position. Fig. 3 is a side view, parts being shown in section. Fig. 4 is a vertical sectional view of the device. Fig. 5 is a plan view, parts being shown in section.

The invention comprises an extensible curtain A secured to and adapted to be rolled up on a spring roller B mounted on a frame or holder C. The holder C comprises a pair of sockets or shells C' for receiving pins $b$ secured in either end of the spring roller B to pivotally secure the roller in the holder. The sockets C' are secured to the ends of a tube or covering F which incloses spring-roller B and serves as a housing for the curtain A and which is provided with a longitudinal slot $f$ through which the curtain may be unwound from the roller. Roller B is of the construction commonly used for shade rollers and in which a spring is placed inside of the roller to rewind the curtain thereon whenever the end of the curtain is released.

The tube F is provided with clamping means G and G', each of which consists of two clamping members H and H' adapted to fit around and clamp the tube to the upper frame member I of the wind shield J by means of the bolt $b'$ and the nut $c'$ and a set screw $d$. Where the use of the clamping means G and G' is not possible, the tube may be securely fastened to the upper frame of the wind shield or other glass carrying frame by providing an aperture E in the member H adjacent the tube and securing these members to the shield or frame by suitable screws or bolts. The members H are riveted to the tube, as shown at $f'$.

The holder or frame C' is provided with a pair of extensible arms D, which are pivotally secured on the bearing studs $e$ of the sockets C'. The extensible arms are adapted to hold the curtain A extended in operative position in front of the wind shield or other glass-carrying frame and each consists of a bearing-member K, pivotally secured to the bearing studs $e$ and adjustable thereon, being held in an adjusted position by means of a set screw $h$, and a tubular rod M pivotally secured to one end of the bearing member K at $k$ to form a hinged joint therewith and an extensible rod N telescoping in the tubular rod M and adapted to be held in adjusted extended position by a set screw $i$ fitting into collar $j$ at one end of the hollow rod M.

The flexible shield, which may be made of rubberized cloth is secured to the spring-roller B at one end and to the front rod O at the other. This rod is provided at either end with eyelets P adapted to receive the ends of the extensible arms D so that the shield or curtain, when unwound from the roller, may be held in extended position on the arms by fitting the ends of the rods N of the extensible arms D into the eyelets P of the curtain-rod O, the curtain being held taut by the spring on the roller. The length of the curtain, which it is desired to have project out of and in front of the wind shield or glass-carrying frame may be regulated by adjusting the telescoping rods N in the tubular rods M to the desired position. The angle which it is desired the curtain is to make with respect to the wind shield or other glass carrying frame may be obtained by adjusting the bearing members K with respect to the bearings c and locking them in position by means of the set screws h. When the curtain is not desired for use, the front rod O may be removed from the ends of the rods N by pulling out on the curtain to disengage the eyelets P from the ends of said rods, and the curtain will then be rolled up within the tube F under the action of the spring roller B. The rods N may then be telescoped into the tubular rods M and these members folded, owing to the hinged connection, up against the tube F, so that the parts of the device will be disposed out of the way of the glass front.

The invention thus exemplifies a protector which is designed to be attached to the frame of an ordinary wind shield or other glass carrying frame and which consists of an extensible curtain held in position in front of the glass frame by a pair of adjustable, foldable rods which may be adjusted at different angles with respect to the upper portion of the frame and which may be folded against said frame when the device is not in use.

The invention is not to be understood as restricted to the details set forth, since these may be modified within the scope of the appended claims without departing from the spirit and scope of the invention.

Having thus described the invention, what we claim as new and desire to secure by Letters Patent, is:

1. In a device of the character described, the combination of a roller, a frame extending longitudinally of the roller and having ends in which the roller is mounted, an extensible curtain on said roller, supporting arms adjustably mounted on the ends of the frame, respectively, to permit them to be shifted in a plane transverse to the axis of the roller, means for holding the arms in adjusted position and means for connecting the free end of the curtain to said arms to hold the curtain extended.

2. In a device of the character described, the combination of a tube, means for securing the tube to a wind-shield, a roller in said tube, an extensible curtain on said roller, arms pivotally connected to the ends of the tube respectively, to swing vertically, means for securing the arms in adjusted position, and means for connecting the free end of the curtain to the arms to hold the curtain extended.

3. In a device of the character described, the combination of a tube provided with end-members, a roller mounted in the tube, an extensible curtain on said roller, pintles projecting from the end of the tube, arms pivoted on said pintles to swing in a plane transverse to the axis of the tube, and screws for securing the arms against rotation relatively to the pintles.

4. In a device of the character described, the combination of a frame, a roller mounted in the frame, an extensible curtain on said roller, arms pivoted to the frame, members slidably connected to said arms and means for connecting the free end of the curtain to the outer ends of the members.

5. In a device of the character described, the combination of a frame, a roller mounted in the frame, supporting arms pivoted to swing to a position substantially parallel with the axis of the roller and extensible holding members slidably mounted in said arms.

6. In a device of the character described, the combination of a tube, means for detachably securing said tube to the frame of a wind shield, a roller mounted in said tube, an extensible curtain on said roller, extensible supporting arms, a rod at one end of said curtain, and eyelets in said rod for securing it to the ends of the extensible arms to hold the curtain in extended position.

CHARLES OTTO FOEDISCH.
ROY J. FOEDISCH.

Witnesses:
MILDRED STUMPF,
ETHEL GERLACH.